United States Patent Office 3,558,778
Patented Jan. 26, 1971

3,558,778
METHODS AND COMPOSITIONS FOR USE IN ANIMAL HUSBANDRY
Robert L. Klingbail, deceased, late of Midland, Mich., by Marion Ruth Klingbail, administratrix, Midland, Mich., assignor to The Dow Chemical Company, Midland, Mich., a corporation of Delaware
No Drawing. Filed Oct. 27, 1966, Ser. No. 590,098
Int. Cl. A61k 27/00
U.S. Cl. 424—245                                  17 Claims

ABSTRACT OF THE DISCLOSURE

Disclosed are methods and compositions for the control of animal parasites which employ as the active component a thiazolium compound or a complex of the thiazolium compound and (A) a phenolic compound; (B) a urea compound; or (C) a metal salt compound.

---

This invention relates to animal husbandry and more particularly to methods and compositions adapted to be employed for improving the growth of animals, for improving the efficiency of the utilization of animal feed, for controlling parasitic organisms and for mitigating against attack of parasitic organisms.

It is an object of the present invention to provide a new and improved practice for raising and benefitting warm-blooded animals such as mice, pigs, dogs, lambs, calves, chickens, ducks, pigeons, geese, and turkeys. A further object is to provide a new and improved method for mitigating against and protecting animals from the attack of parasitic organisms. An additional object is the provision of a method of improving the utilization of feed by animals and for improving feed efficiency. Another object is the improvement in the nutritive value of the feed ingested and utilized by animals so as to obtain a growth-furthering effect and an improved feed utilization. Another object is to provide a novel method for the control of nematode, helminth and other parasitic organisms which attack animals. It is a particular object of the present invention to provide a novel method for controlling such parasitic organisms in the egg and larval stages; an additional particular object is to provide a novel method for preventing and/or controlling the development of that stage of a parasitic organism which is known as "migratory," in which stage the organism migrates through the blood stream and/or lymph system of the host into a great variety of other internal organs of the host's body, such as the liver and lungs. Another object is to provide a novel method for benefitting and improving the growth of animals. Still another object is to provide a method which can be employed prophylatically to protect animals from the attack of parasitic organisms without adversely affecting metabolic activity, reproduction, blood formation, or other function of animals. More particularly, it is a further object to provide a method which can be employed prophylatically to protect animals from the attack of parasitic organisms in the egg and larval stages. A yet further object is to provide novel feed compositions and other novel compositions adapted to be employed in the new methods in animal husbandry. Other objects will appear throughout the following specification and appended claims.

The present invention is directed to methods employing and compositions comprising an active material a thiazolium compound which is a member selected from the group consisting of a material of structural Formula I:

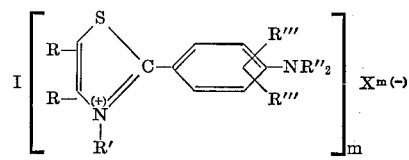

its complex with a phenolic compound, its complex with a urea compound; and its complex with a metal salt compound.

The term "thiazolium compound" is employed herein to describe a product or products of this definition, only. In the above and succeeding formulae, X represents a pharmaceutically acceptable anion; R, each being taken separately, represents a member selected from the group consisting of hydrogen and loweralkyl, or both R moieties, taken together, represent straight-chain alkylene being of from 3 to 6, both inclusive, carbon atoms; R' represents primary loweralkyl; each R" independently represents a member selected from the group consisting of hydrogen and primary loweralkyl; each R''' independently represents a member selected from the group consisting of hydrogen, bromo, chloro, methoxy, and methyl; and $m$ represents an integer equal to the valence of the anion X.

The term "phenolic compound" is employed in the present specification and claims to designate a compound of the following formula only:

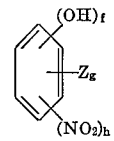

wherein each Z independently represents, subject only to known factors of steric hindrance, a member selected from the group consisting of halo, alkyl, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive, the sum of $f$, $g$, and $h$ being an integer of from 1 to 6, both inclusive. The term "alkyl" is employed in the present specification and claims to designate an alkyl radical being of from 1 to 6, both inclusive, carbon atoms.

Representative phenolic compounds include phenol, p-iodophenol, p-nitrophenol, pyrocatechol, resorcinol, hydroquinone, pyrogallol, 1,2,4-benzenetriol, phloroglucinol, 1,2,4,5-benzenetetrol, benzenehexol, o-methoxyphenol, 2,4,5 - trichlorophenol, 2,4 - dinitrophenol, m - cresol, p-cresol, 4-n-hexylresorcinol, cresol, 4-bromo-m-cresol, 4-ethylresorcinol, tetrachloropyrocatechol, 4-nitropyrocatechol, 2,5-dimethoxyhydroquinone, trichloropyrogallol, and dimethylphloroglucinol.

In the present specification and claims, the term "urea compound" is employed to designate only a member selected from the group consisting of urea, thiourea, guanidine, guanidine hydrochloride, and biuret; and the term "metal salt compound" is employed only to designate a compound of the formula $$M_aY_b$$

wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of $a$ and $b$ represents an integer such that ($a$ times the valence of M) is equal to ($b$ times the valence of Y).

In the present specification and claims, the unmodified term "loweralkyl" is employed to designate alkyl radicals being of from 1 to 4, both inclusive, carbon atoms. The term "primary loweralkyl" designates an alkyl radical being of from 1 to 4, both inclusive, carbon atoms, and having a $CH_2$ group at the point of attachment. Thus, the term "primary loweralkyl" designates methyl, ethyl, n-propyl, n-butyl, and isobutyl. As employed in the present specification and claims, the term "halide" designates appearances of chlorine, bromine, and iodine atoms, only.

In the instance of a complex with phenolic compound, urea compound, or metal salt compound, such complex generally forms as a 1:1 complex, that is, one molecule of material of Formula I and one molecule of complexing agent (phenolic compound, urea compound, or metal salt compound); as a 2:1 complex, that is, two molecules of material of Formula I and one molecule of complexing agent; or as a 1:2 complex, that is, two molecules of complexing agent and one molecule of material of Formula I. Complexes having other ratios can be prepared and also are comprehended within the definition of thiazolium compound of the present invention. It is noted that inasmuch as the material of Formula I has $m$ units of the positive radical defined there by the parentheses, a 1:1 complex comprises more than one such positive radical whenever $m$ represents an integer in excess of 1.

Hence, the complex of the material of Formula I with the phenolic compound, the urea compound, or the metal salt compound can be described, in an alternate expression, as being most frequently of the following formula:

wherein G, in each of its $d$ occurrences, represents the material of Formula I; Z', in each of its $e$ occurrences, represents the same member selected from the group consisting of the phenolic compound, the urea compound, and the metal salt compound; and each of $d$ and $e$ represents an integer being of from 1 to 2, both inclusive, the sum of $d$ and $e$ being an integer of from 2 to 3, both inclusive.

In the instance of a complex with a metal salt compound, each of the units which constitute the complex, that is, (A) the material of Formula I and (B) the metal salt compound, comprises an anion. These anions are interchangeable. Therefore, in an alternate expression applicable to the metal salt complexes, these complexes can be described as being of the following structural formula

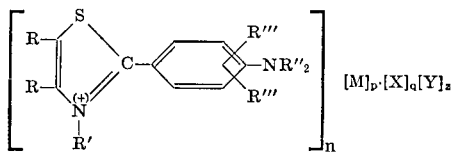

in which each of $n$, $p$, $q$, and $z$ is an integer and $[n+(p$ times the valence of M$)]$ is equal to the value of $[(q$ times the valence of X$)+(z$ times the valence of Y$)]$. In a preferred embodiment of such complexes, the anions X and Y are identical.

The primary attribute of the pharmaceutically acceptable anion (X and also, in the instance of the metal salt complexes, Y) is non-toxicity. The choice of the anion is not critical, although a given anion may in some instances exhibit special advantages, due to solubility, ease of crystallization, lack of objectionable taste and the like. Representative pharmaceutically acceptable anion moieties include the following: chloride, bromide, iodide, sulfate, bisulfate, acetate, salicylate, valerate, oleate, phenate, laurate, borate, benzoate, lactate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, carbonate, cacodylate, aconitate, sulfamate, gentisate, malate, cinnamate, stearate, and the like.

Hence, representative metal salt complexes to be employed in accordance with the present invention are those of a given product of Formula I and each of the following metal salt compounds:

Antimony acetate, antimony trichloride, antimony tribromide, antimony triiodide, antimony sulfate, antimony tartrate, bismuth acetate, bismuth benzoate, bismuth tribromide, bismuth trichloride, bismuth citrate, bismuth triiodide, bismuth lactate, bismuth salicylate, bismuth sulfate, bismuth tartrate, cupric acetate, cuprous acetate, cupric benzoate, cuprous bromide, cupric bromide, cupric butyrate, cuprous chloride, cupric chloride, cupric citrate, cupric formate, cupric glyceride, cupric lactate, cupric laurate, cupric oleate, cupric salicylate, cupric stearate, cuprous sulfate, cupric sulfate, cuprous sulfite, cupric tartrate, ferrous acetate, ferric acetate, ferric benzoate, ferrous bromide, ferric bromide, ferrous carbonate, ferrous chloride, ferric chloride, ferric citrate, ferric formate, ferrous iodide, ferrous lactate, ferric lactate, ferric malate, ferric oleate, ferrous sulfate, ferric sulfate, ferrous tartrate, manganese acetate, manganese benzoate, manganese bromide, manganese chloride, manganese citrate, manganese formate, manganese iodide, manganese lactate, manganese orthophosphate, manganese metasilicate, manganese sulfate, manganese tartrate, manganese valerate, stannous acetate, stannous bromide, stannous chloride, stannous chromate, stannous iodide, stannous orthophosphate, stannous sulfate, stannous tartrate, zinc acetate, zinc aluminate, zinc benzoate, zinc borate, zinc bromide, zinc butyrate, zinc caproate, zinc carbonate, zinc chloride, zinc chromate, zinc citrate, zinc formate, zinc iodide, zinc lactate, zinc laurate, zinc oleate, zinc salicylate, zinc stearate, zinc sulfate, zinc sulfite, and zinc tartrate.

The thiazolium compound of the present invention can exist as a hydrate, ordinarily as a hemihydrate, monohydrate, or dihydrate, and it is frequently convenient to prepare and separate a given product as a hydrate. Sometimes the hydrate contains a higher proportion of water per molecule of complex, such as 2 to 10 moles of water per mole of complex. Also, the products, particularly those in which X, or one or both of X and Y in the instance of the metal salt complexes, represent(s) a halogen atom, sometimes exist at least initially as a hydrohalide addition salt at the site of the para amino nitrogen. However, these hydrohalide salts readily dehydrohalogenate upon recrystallization or even merely upon standing. Because of this instability, their use is not generally preferred. However, regardless of the existence of a given material as a hydrate or hydrohalide addition salt, or of the ratio of complexing in the instance of a complex, all of such materials are comprehended within the definition of thiazolium compound and can be employed for the useful purposes of the present invention.

Representative products to be employed in accordance with the present invention include the following:

2-(p-dimethylaminophenyl)-3,4,5-trimethylthiazolium p-toluenesulfonate;
2-(p-dimethylaminophenyl)-3,4,5-trimethylthiazolium iodide;
2-(p-dimethylaminophenyl)-3,4,5-trimethylthiazolium bromide;
2-(p-dimethylaminophenyl)-3,4,5-trimethylthiazolium bromide 1:1 complex with cupric bromide;
2-(p-dimethylaminophenyl)-3,4,5-trimethylthiazolium iodide 1:1 complex with cuprous iodide;
2-(p-dimethylaminophenyl)-3,4-dimethylthiazolium p-toluenesulfonate;

2-(p-dimethylaminophenyl)-3,4-dimethylthiazolium iodide;
2-(p-dimethylaminophenyl)-3,4-dimethylthiazolium sulfate;
2-(p-dimethylaminophenyl-4,5,6,7-tetrahydro-3-methylbenzothiazolium iodide;
2-(2,5-dichloro-4-isobutylaminophenyl)-5-methyl-3-ethylthiazolium valerate 1:1 complex with manganese valerate;
2-(3-methyl-4-dipropylamiophenyl)-3,4,5-trimethylthiazolium iodide;
2-(2-bromo-5-methoxy-4-dimethylaminophenyl)3,4,5-trimethylthiazolium oleate 1:1 complex with ferric oleate;
2-(3,5-dimethyl-4-dimethylaminophenyl)-3,4-dimethylthiazolium bromide 2:1 complex with cupric bromide;
2-(p-dimethylaminophenyl)-3-methylcyclooctathiazolium bromide;
2-(p-dimethylaminophenyl)4,5-dimethyl-3-isobutylthiazolium iodide 1:2 complex with urea;
2-(p-dimethylaminophenyl)-3,4,5-trimethylthiazolium chloride 1:1 complex with ferrous chloride;
2-(p-dimethylaminophenyl)-3,4,5-trimethylthiazolium p-toluenesulfonate 1:1 complex with urea, hemihydrate;
2-(p-dimethylaminophenyl)-4,5,6,7-tetrahydro-3-methylbenzothiazolium p-toluenesulfonate;
2-(p-dimethylaminophenyl)-4,5,6,7-tetrahydro-3-methylbenzothiazolium ioide 1:1 complex with bismuth iodide;
2-(p-dimethylaminophenyl)-4,5-diethyl-3-n-propylthiazolium salicylate;
2-(p-dimethylaminophenyl)-4,5-diethyl-3-n-propylthiazolium salicylate 1:1 complex with bismuth salicylate;
2-(p-diethylaminophenyl)-4,5-dimethyl-3-n-butylthiazolium chloride;
2-(p-dimethylaminophenyl)-5-n-butyl-3,4-dimethylthiazolium formate 1:.1 complex with guanidine hydrochloride;
2-(p-dimethylaminophenyl)-3-methylthiazolium carbonate 1:1 complex with ferric carbonate;
2-(p-diethylaminophenyl)-3,4,5-trimethylthiazolium butyrate 1:1 complex with m-cresol;
2-(p-dimethylaminophenyl)-3,4,5-trimethylthiazolium chloride;
2-(3-methyl-4-dimethylaminophenyl)-3-methylcycloheptathiazolium dihydrogen phosphate 1:1 complex with stannous phosphate;
2-(p-dimethylaminophenyl)-3-methylthiazolium acetate 1:1 complex with o-methoxyphenol;
2-(p-dimethylaminophenyl)-3-methylthiazolium iodide 1:1 complex with p-iodophenol;
2-(p-diethylaminophenyl)-3,4-dimethylthiazolium bromide 2:1 complex with thiourea;
2-(p-dimethylaminophenyl)-3,4,5-trimethylthiazolium chloride 1:1 complex with biuret;
2-(p-dimethylaminophenyl)-3-methyliazolium iodide 1:1 complex with resorcinol;
2-(p-dimethylaminophenyl)-4,5,6,7-tetrahydro-3-ethylbenzothiazolium hydrogen sulfate 1:1 complex with phenol;
2-(2,5-dichloro-4-dimethylaminophenyl)-3-methylthiazolium benzoate 1:1 complex with guanidine;
2-(p-dimethylaminophenyl)-4-n-propyl-3-methylthiazolium lactate 1:1 complex with manganese lactate;
2-(2-methoxy-4-dimethylaminophenyl)-3,4-dimethylthiazolium bromide 1:1 complex with pyrocatechol;
2-(p-dimethylaminophenyl)-3,4,5-trimethylthiazolium hydrogen sulfate 1:1 complex pyrogallol;
2-(p-dimethylaminophenyl)-3-methylthiazolium p-toluenesulfonate 1:1 complex with hydroquinone; and
2-(p-dimethylaminophenyl)-3,4,5-trimethylthiazolium chloride 1:1 complex with zinc chloride.

Most broadly, the present invention is concerned with methods and compositions useful in animal husbandry.

Thus, in one embodiment, the present invention is directed to a method which comprises administering to an animal a thiazolium compound which is a member selected from the group consisting of a material of Formula I:

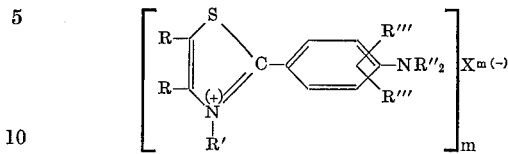

its complex with a phenolic compound; its complex with a urea compound; and its complex with a metal salt compound.

The practice of this embodiment of the present invention, even at very low rates of administration, improves the nutritive value of animal feed so as to obtain a growth-furthering effect and improve the efficiency of the utilization of feed by animals. The practice also improves the growth made by the animals and, especially at rates of administration in excess of the very low rates, gives excellent protection against the attack of such parasitic organisms as Nematodirus, Ascaris, Haemonchus, Chabertia, Trichostrongylus, Strongyloides, *Necator americanus*, Moniezia, Thysanosoma, Ostertagia, Trichuris, Cooperia, Bunostomum, Oesophagostomum, Toxascaris, Hymenolepis, Aspicularis, Syphacia, Ancylostoma, Uncinaria, Taenia, Toxocara, Dipylidium and Physaloptera, in normal or abnormal hosts.

The compounds to be employed according to the present invention are crystalline solids which are somewhat soluble in organic solvents and are adapted to be administered to animals. The compounds are not repellent to animals and can be employed in admixture with grain rations or animal feeds. They can be administered continuously or intermittently in dosages sufficient to improve growth, to improve the feed efficiency, to improve the nutritive value and utilization of feed or to protect the animal from the attack of parasite organisms without in any way causing detriment to the animal or without imparting any unpalatable characteristic to animal flesh.

The administration or feeding of an effective growth-improving dosage of at least one of the compounds to be employed according to the present invention is essential and critical for the practice of this embodiment of the present invention. The amount of one or more of the compounds which will constitute an effective dosage varies considerably and is dependent upon such factors as the animal concerned, the age of the animal, the parasitic organism against which protection is sought, the life state of such organism against which protection is sought, the particular compound employed, and the like. In general, good results are obtained when there is administered to an animal a dosage of from 0.1 to 1,000 milligrams of one of the compounds per kilogram of body weight and preferably from 1 to 500 milligrams per kilogram of body weight. Where the compound is administered on a daily schedule, good results are obtained when employing daily dosages of from 0.1 to 150 milligrams or more of one of the compounds per kilogram of animal body weight. Where the danger of reexposure to the attack of intestinal parasites from contaminated feed or surroundings is low, good results are obtained when there is administered to an animal a daily dosage of from 0.5 to 50 milligrams or more per kilogram of body weight. Where such danger of reexposure is very low, good results are frequently obtained when an animal is dosed on a single occasion with from 2.5 to 1,000 milligrams of one of the compounds per kilogram of body weight.

The method of this embodiment of the present invention can be carried out by administration or feeding of the unmodified compounds. However, the present invention embraces the employment of any liquid, powder, mash, drench, bolus, pellet, capsule or other animal food containing one or more of the active compounds. In such usage, the compounds can be modified with one or more of a plurality of additaments or innocuous ingestible adjuvants including water, ethanol, skim milk, edible oils, propylene glycol, syrups, grain rations, surface active dispersing agents such as the liquid and solid emulsifying agents, and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. In such animal feed compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The active material can also be dispersed, with or without vitamin, mineral, or other feed supplements, upon a material, such as spaghnum moss, which serves as an edible mechanical support or roughage. The resulting treated material is employed as, or in addition to other, animal feed, or supplied to young nursing animals not yet feeding on the feed ration normally fed to the adult animals.

The exact concentration of the compounds to be employed in the compositions can vary provided that enough of the composition is ingested by the animal so as to provide the required internal amount of active ingredient. For example, where direct administration to the individual animal is preferred, liquid or solid compositions containing from 0.5 to 98 percent by weight of one or more of the agents conveniently are employed to supply the desired dosage. Representative of this type of composition is the relatively concentrated composition containing one of the active agents and nutritive supplementary materials, which composition is provided for the ad libitum consumption by animals, that is, a "salt-block" type of composition. Also representative of such compositions is a slow-release type of composition containing one of the active agents in the form of small pellets or granules which are administered orally and which lodge internally and release their contents over an extended period of time. Where one or more of the compounds is provided as a constituent of the principal food or water ration, satisfactory results are obtained with rations containing a minor but effective amount of the compounds. The exact amounts of the compounds in the ration or drinking water are dependent upon the food and water consumption and feeding and watering habits of the animal concerned. In animal feeds, the required dosage can be supplied with feeds containing at least 0.001 percent or more and usually from 0.001 to 0.5 percent by weight of active material. When fed as the principal food ration, the required dosage is conveniently supplied with feeds containing from 0.001 to 0.3 percent by weight of active material. Where the compounds are furnished in the drinking water, good results are obtained at concentrations of the agents in the water equal to one-half those employed when the compounds are supplied as a constitutent in the principal food ration. In compositions to be employed as concentrates, the active agents can be present in a concentration of from 0.5 to 98 or 5 to 98 percent by weight. Preferred concentrate compositions often times contain two or more percent by weight of a liquid or solid surface active agent.

Liquid feed compositions containing the desired amount of the compounds can be prepared by dissolving the compounds in ethanol, propylene glycol or an edible oil or by dispersing them in water with or without the aid of a suitable surface active dispersing agent such as an ionic or non-ionic surface active agent. Suitable surface active dispersing agents includes the glycerol and sorbitan esters of fatty acids and the polyoxyalkylene derivatives of fatty alcohols and of sorbitan esters. The aqueous compositions can contain one or more water-immiscible oils as a solvent for the active agent. In such compositions, the water, oil and emulsifying agent constitute and aqueous emulsion adjuvant or helper.

In the preparation of solid feed compositions, the compounds can be mechanically ground with an edible solid such as cereal meal, ground yellow corn, ground oats, finely ground meat and bone scraps, or a solid surface active dispersing agent such as finely divided bentonite or fuller's earth. These compositions can be administered in the form of capsules or tablets or dispersed in an animale feed and such feed used to supply a part of all of the ration. Alternatively, the compounds can be dissolved in an organic solvent such as alcohol or acetone and the resulting mixture dispersed in an animal feed which is then dried to remove the solvent. The compounds can also be dispersed in an edible oil such as coconut, olive, linseed, soybean, cottonseed or peanut oil, or animal fats and tallows, and the resulting mixtures dispersed in the feed. These edible oil compositions can contain one of the aforementioned emulsifying materials as a dispersing agent.

Where the parasite control of the foregoing embodiment is the prime object, such control can be achieved in another embodiment. In this embodiment, the present invention is directed to a method for the control of a parasitic organism which is a parasite of a host animal body, which comprises contacting the parasitic organism in its infective phase outside the host animal body with a parasiticidal amount of a thiazolium compound which is a member selected from the the group consisting of a material of Formula I:

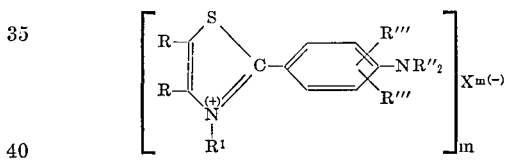

its complex with a phenolic compound; its complex with a urea compound; and its complex with a metal salt compound.

Thus, the same active material is employed in, and the same kinds of parasites are controlled by, both embodiments, the present embodiment wherein the infective phase of the parasite is contacted outside of the host animal body, as well as the previous embodiment wherein the parasite is contacted inside the host animal body by administration of the active material to the host. However, the previous embodiment has growth-enhancing effects independent from its parasiticidal effects in addition, it generally affords more complete parasite control. For these reasons, the previous embodiment is generally preferred.

While the terms "infective stage" and "infective phase" are equivalent as to meaning and are well known and understood in the field of parasitology, the particular developmental stage of the parasitic organism which is the infective stage or phase varies with the identify of the specific parasitic organism. Most commonly, the infective phase is the egg of the organism; in other instances, such as in some of the ascarids, that is, those parasitic organisms which are of the family Ascaridae, the infective phase is an egg which, following its passage from a prior host animal body, develops into a form known as an embryonated egg. In still other instances, the infective phase is a larval form. However, the method of this embodiment is effective regardless of the developmental stage which is the infective phase of a given paraistic organism.

The contacting of a parasite in its infective phase outside the host animal body with a parasiticidal amount of the active material is essential and critical to the practice of this embodiment of the present invention. This embodiment can be carried out by application of the unmodified products. However, it is more conveniently carried out by employing the active material in a composition, which may be a liquid, dust, or granular solid composition.

In liquid, dust, or granular composition, the active material is modified with one or a plurality of additaments or adjuvants for parasiticidal compositions such as water or other liquid carriers, surface-active dispersing agents and finely divided solids. Depending upon the concentration of active compound, such augmented compositions are adapted to be applied to parasites in their infective phase or to be employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound.

The exact concentration of the active material to be employed in the treating compositions is not critical and may vary considerably provided the required dosage of active material is supplied upon the parasitic organism or its habitat. The concentration of the active material in liquid compositions employed to supply the desired dosage generally is from about 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active material can be present in a concentration of from about 5 to 98 percent by weight.

The quantity of the composition applied is not critical provided only that the required dosage of active material is applied in sufficient of the finished composition to cover adequately the habitat of parasitic organisms to be controlled.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvent, emulsifying agent, active agent, and water. The mounts of the various ingredients to be employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the active material such as talc, chalk, gypsum and the like. In such operations, the finely divided carrier is mixed with the active material or a volatile organic solvent solution thereof. Similarly, dust compositions containing the active material are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk or gypsum and the like to obtain the desired amount of active material in compositions adapted to be employed for the control of parasitic organisms outside of the host animal body. Also, such concentrated dust compositions can be dispersed in water with or without the aid of a dispersing agent, to form spray mixtures.

When operating in accordance with this embodiment of the present invention, the active material or preferably a composition comprising the active material is applied to interior walls and floors of barns, animal pens, and the like in any convenient fashion, for example, with power sprayers and dusters and boom and hand sprayers.

The following examples illustrate the invention but are not to be construed as limiting.

EXAMPLE 1

2-(p-dimethylaminophenyl) - 3,4 - dimethylthiazolium iodide was incorporated in a complete mouse feed to prepare a feed composition containing 0.06 percent of the subject compound. This feed composition and unmodified feed were separately fed as sole rations to groups of mice having a heavy infestation of tapeworms (*Hymenolepis spp.*). About seven days following the initiation of the diets, the mice were sacrificed and autopsied. An examination of each mouse was made and the treated mice compared with the untreated check mice as regards the number of worms to be found in their gastro-intestinal tracts. As a result of the examination, there was found a complete control of *Hymenolepis spp.* in the treated mice with a continued heavy infestation in the untreated group.

EXAMPLES 2–5

Results essentially the same as those obtained in the evaluation reported in Example 1 were obtained when evaluating each of the following compounds, separately, in the procedures of Example 1:

2-(p-dimethylaminophenyl)-3,4,5,-trimethylthiazolium iodide;
2-(p-dimethylaminophenyl)4,5,6,7-tetrahydro-3-methylbenzothiazolium idodide;
2-(p-dimethylaminophenyl)3,4,5-trimethylthiazolium chloride 1:1 complex with zinc chloride; and
2-(p-dimethylaminophenyl)-3,4,5-trimethylthiazolium p-toluenesulfonate 1:1 complex with urea hemihydrate.

EXAMPLES 6–8

Various of the compounds to be employed according to the present invention were evaluated for the control of *Ascaris lumbricoides* var. suum in the larval state and for the prevention and/or control of the migration of such Ascaris larvae. In these evaluations, each of the subject compounds was separately dispersed in a commercial swine feed to produce an animal feed composition containing the subject compound. A number of swine, all of the same history and past environment and all of an age of about 5 to 6 weeks, were divided into groups. Feeding of the swine was begun, various groups (the treated groups) being respectively fed the modified animal feed compositions containing the various subject compounds, another group (the control group) being fed the unmodified commercial swine feed. Simultaneously with the initiation of the feeding and 17 days thereafter, all of the swine were weighed and the average weight for each group determined. Seventy-two hours after initiation of the feeding, each animal was inoculated with 25,000 embryonated ova of *Ascaris lumbricoides* var. suum; a second inoculation of each animal with 25,000 embryonated ova of *Ascaris lumbricoides* var. suum was made ninety-six hours following initiation of the feeding. Thereafter, the swine were observed for the remainder of the 17-day period following initiation of the feeding for symptoms of the attack of migrating larvae of *Arcaris lumbricoides* var. suum. About 7 days after the first inoculation thereof with the Ascaris larvae, the swine of the control group exhibited symptoms of the attack of Arcaris larvae, namely, elevated temperatures, respiratory difficulties such as coughing and labored breathing, and disturbances of growth, such as anorexia, all such symptoms being attributable to the presence of the migrating larvae of *Ascaris lumbricoides* var. suum in the respiratory system. In the treated groups, no symptoms of the attack of migratory Ascaris larvae were observed at any time, and the swine were judged to be in all respects normal and healthy.

The various subject compounds, the respective concentrations thereof in the feed compositions, the average weight per animal for each of the groups, the average weight gained per animal for each of the groups, and the feed efficiency for each of the groups, are set forth in the following table. The feed efficiency is the number of pounds of feed eaten per pound of body weight gained.

taining 90 percent by weight of one of the compounds to be employed according to the present invention are prepared from 2-(p-dimethylaminophenyl)-3,4,5-trimethylthiazolium p-toluenesulfonate;
2-(p-dimethylaminophenyl)-3,4,5-trimethylthiazolium iodide;
2-(p-dimethylaminophenyl)-3,4,5-trimethylthiazolium bromide;
2-(p-dimethylaminophenyl)-3,4,5-trimethylthiazolium bromide 1:1 complex with cupric bromide;
2-(p-dimethylaminophenyl)-3,4,5-trimethylthiazolium iodide 1:1 complex with cuprous iodide;
2-(p-dimethylaminophenyl)-3,4-dimethylthiazolium p-toluenesulfonate;
2-(p-dimethylaminophenyl)-3,4-dimethylthiazolium iodide;
2-(p-dimethylaminophenyl)-3,4-dimethylthiazolium sulfate;
2-(p-dimethylaminophenyl)-3-methyl-4,5,6,7-tetrahydrobenzothiazolium iodide;
2-(2,5-dichloro-4-isobutylaminophenyl)-5-methyl-3-ethylthiazolium valerate 1:1 complex with manganese valerate;
2-(3-methyl-4-dipropylaminophenyl)-3,4,5-trimethylthiazolium iodide;

| Subject compound | Percent concentration of subject compound in diet | Average weight per animal in pounds | | Average weight gained per animal in pounds | Feed efficiency per group |
| --- | --- | --- | --- | --- | --- |
| | | Upon initiation of feeding | 17-days following initiation of feeding | | |
| Example 6: 2-(p-dimethylaminophenyl)-3,4,5-trimethylthiazolium iodide | .006 | 25.5 | 38.5 | 13.0 | 2.77 |
| Example 7: 2-(p-dimethylaminophenyl)-3,4,5-trimethylthiazolium chloride 1:1 complex with zinc chloride | .006 | 28.0 | 41.0 | 13.0 | 2.69 |
| Example 8: 2-(p-dimethylaminophenyl)-3,4,5-trimethylthiazolium p-toluenesulfonate 1:1 complex with urea hemihydrate | .006 | 26.5 | 46.0 | 19.5 | 2.29 |
| Control | | 30.5 | 40.0 | 9.5 | 3.78 |

EXAMPLE 9

2-(p-dimethylaminophenyl) - 3,4 - dimethylthiazolium iodide was evaluated further, according to the procedures employed in Example 6, for the control of the larval stage of *Ascaris lumbricoides* var. suum in swine. In these operations, the subject compound was incorporated in a modified animal feed composition at the rate of 0.006 percent of the total compositions.

About 7 days after the first inoculation thereof with the Ascaris larvae, the swine of the control group exhibited symptoms of the attack of Ascaris larvae, namely, elevated temperatures, respiratory difficulties such as coughing and labored breathing, and disturbances of growth, such as anorexia, all such symptoms being attributable to the presence of the migrating larvae of *Ascaris lumbricoides* var. suum in the respiratory system. In the treated group, no symptoms of the attack of migratory Ascaris larvae were observed, and the swine in this group were judged to be in all respects normal and healthy.

At the end of the seventeen-day period, all of the swine were sacrificed and the liver of each examined to determine the presence, and if present, number, of scars due to the passage of migrating larvae of *Ascaris lumbricoides* var. suum. In the treated group, no scars were observed in any liver. In the control group, each liver was heavily scarred; it was judged that each bore in excess of three-hundred scars.

EXAMPLE 10

Ninety parts by weight of 2-(p-dimethylaminophenyl)-3,4,5-trimethylthiazolium iodide are mechanically ground with bentonite to produce a concentrated composition containing 90 percent by weight of the subject compound.

In identical procedures, concentrate compositions con- 2-(2-bromo-5-methoxy-4-dimethylaminophenyl)-3,4,5-trimethylthiazolium oleate 1:1 complex with ferric oleate;
2-(3,5-dimethyl-4-dimethylaminophenyl)-3,4-dimethylthiazolium bromide 2:1 complex with cupric bromide; and
2-(p-dimethylaminophenyl)-3-methylcycloöctathiazolium bromide.

EXAMPLE 11

In other procedures, feed supplements are prepared by grinding together 50 parts by weight of one of the compounds to be employed according to the present invention with one part of sorbitan monopalmitate (Span 20) and 49 parts of attapulgite clay to produce compositions containing 50 percent by weight of one of the subject compounds. In these procedures, feed supplements are prepared with each of the compounds identified in Example 10 and with 2-(p-dimethylaminophenyl)-4,5-dimethyl-3-isobutylthiazolium iodide 1:2 complex with urea;
2-(p-dimethylaminophenyl)-3,4,5-trimethylthiazolium chloride 1:1 complex with ferrous chloride;
2-(p-dimethylaminophenyl)-3,4,5-trimethylthiazolium p-toluenesulfonate 1:1 complex with urea, hemihydrate;
2-(p-dimethylaminophenyl)-4,5,6,7-tetrahydro-3-methylbenzothiazolium p-toluenesulfonate;
2-(p-dimethylaminophenyl)-4,5,6,7-tetrahydro-3-methylbenzothiazolium iodide 1:1 complex with bismuth iodide;
2-(p-dimethylaminophenyl)-4,5-diethyl-3-n-propylthiazolium salicylate;
2-(p-dimethylaminophenyl)-4,5-diethyl-3-n-propylthiazolium salicyclate 1:1 complex with bismuth salicyclate;

2-(p-diethylaminophenyl)-4,5-dimethyl-3-n-butyl-
thiazolium chloride;
2-(p-dimethylaminophenyl)-5-n-butyl-3,4-dimethyl-
thiazolium formate 1:1 complex with guanidine
hydrochloride;
2-(p-dimethylaminophenyl)-3-methylthiazolium
carbonate 1:1 complex with ferric carbonate;
2-(p-diethylaminophenyl)-3,4,5-trimethylthiazolium
butyrate 1:1 complex with m-cresol;
2-(p-dimethylaminophenyl)-3,4,5-trimethylthiazolium
chloride; and
2-(3-methyl-4-dimethylaminophenyl)-3-methylcyclo-
heptathiazolium dihydrogen phosphate 1:1 complex
with stannous phosphate.

EXAMPLE 12

In other operations, 20 parts by weight of one of the compounds to be employed according to the present invention are mechanically mixed with 80 parts of soy bean meal to produce animal feed compositions containing 20 percent of one of the compounds. In this operation, such animal feed compositions are prepared with each of the compounds identified in Examples 10 and 11 and with 2-(p-dimethylaminophenyl)-3-methylthiazolium
acetate 1:1 complex with o-methoxyphenol;
2-(p-dimethylaminophenyl)-3-methylthiazolium
iodide 1:1 complex with p-iodophenol;
2-(p-diethylaminophenyl)-3,4-dimethylthiazolium
bromide 2:1 complex with thiourea;
2-(p-dimethylaminophenyl)-3,4,5-trimethylthiazolium
chloride 1:1 complex with biuret;
2-(p-dimethylaminophenyl)-3-methylthiazolium
iodide 1:1 complex with resorcinol;
2-(p-dimethylaminophenyl)-4,5,6,7-tetrahydro-3-
ethylbenzothiazolium hydrogen sulfate 1:1 complex
with phenol;
2-(2,5-dichloro-4-dimethylaminophenyl)-3-methyl-
thiazolium benzoate 1:1 complex with guanidine;
2-(p-dimethylaminophenyl)-4-n-propyl-3-methyl-
thiazolium lactate 1:1 complex with manganese
lactate;
2-(2-methoxy-4-dimethylaminophenyl)-3,4-dimethyl-
thiazolium bromide 1:1 complex with pyrocatechol;
2-(p-dimethylaminophenyl)-3,4,5-trimethylthiazolium
hydrogen sulfate 1:1 complex with pyrogallol;
2-(p-dimethylaminophenyl)-3-methylthiazolium p-
toluenesulfonate 1:1 complex with hydroquinone; and
2-(p-dimethylaminophenyl)-3,4,5-trimethylthiazolium
chloride 1:1 complex with zinc chloride.

EXAMPLE 13

In an additional operation, one of the subject compounds to be employed according to the present invention, in the amount of 10 parts by weight, is dispersed in 90 parts by weight of cottonseed oil to prepare an edible oil composition containing the compound. This operation is carried out separately with each of the subject compounds of Examples 10, 11 and 12.

These compositions are adapted to be administered to animals to supply the desired dosage of active compound or to be employed as concentrates and subsequently diluted with additional edible adjuvants, grain rations, or animal feeds, to produce animal feed compositions containing the desired amount of active agents.

EXAMPLE 14

Each of the subject compounds as identified in Examples 10, 11, and 12 is employed to prepare an animal feed composition containing 0.015 percent by weight of one of the subject compounds. In these procedures, the particular subject compound is dispersed in a commercial swine feed to produce the feed composition. These compositions are of outstanding nutritive value and are adapted to be fed to animals to obtain a growth-furthering effect and superior feed efficiency. The compositions are also useful in animal husbandry to control parasitic organisms. In particular, such compositions are useful to control the larvae of parasitic organisms and to prevent and/or control the attack of migrating larvae of parasitic organisms, such as Ascaris lumbricoides var. suum.

EXAMPLE 15

In a further embodiment, the compounds to be employed in accordance with the present invention, or compositions containing the same, advantageously can be employed in the present methods and compositions in combination with one or more other feed additives, including agents active against parasitic organisms, antibiotic materials, hormone and hormone-like materials and agents to improve feed efficiency. Such feed additives can be included either as adjuvants or as supplemental materials. Representative feed additives and agents include chlortetracycline, oxytetracycline, penicillin, bacitracin and bacitracin salts, streptomycin, tylosin, hygromycin, erythromycin, oleandomycin, 4-amino-phenylarsonic acid, sodium arsanilate, 3-nitro-4-hydroxyphenylarsonic acid, oil of chemopodium, sodium fluoride, cadmium oxide, cadmium anthranilate, and piperazine and substituted piperazine compounds.

In representative operations, each of the food additives identified in the preceding paragraph together with one of the compounds shown in Examples 10, 11 and 12 is mechanically mixed and ground with commercial swine feed to produce animal feed compositions. In such operations, the materials are employed in amounts sufficient to provide food compositions containing 0.00125 percent by weight of one of the feed additives identified in the preceding paragraph and 0.006 percent by weight of one of the compounds shown in the specified earlier examples. These compositions are of excellent value in animal husbandry and are adapted to be fed to swine to obtain a growth-furthering effect and superior feed efficiency and to mitigate against the attack of parasitic organisms such as Ascaris lumbricoides var. suum.

The products to be employed in accordance with the present invention are prepared in known procedures. In preparing the uncomplexed products, that is, products of structural Formula I, an alpha-haloketone of the formula:

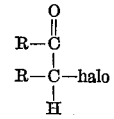

is condensed with a para-aminothiobenzamide compound of the formula

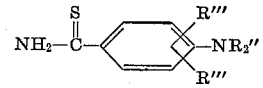

The condensation is carried out by reacting the alpha-haloketone with the para-aminothiobenzamide in the presence of an alkali metal acetate. The reaction is conveniently carried out in the presence of an organic liquid as reaction medium; suitable such media include the alkanols, glycols, and glycol ethers. The reaction consumes the reactants and alkali metal acetate in amounts representing equimolecular proportions of each of the alpha-haloketone, para-aminothiobenzamide, and alkali metal acetate. The reaction goes forward readily at temperatures of from about room temperature to the boiling temperature of the reaction medium employed. The resulting thiazole material, of the formula

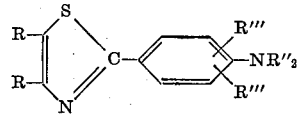

is separated from the reaction mixture in conventional procedures. Typically, solvent is removed from the reaction mixture by evaporation under subatmospheric pressure and the resulting residue, comprising the thiazole material and alkali metal by-product salt, dispersed in water and filtered to separate the thiazole material. Purification, if desired, can be carried out in conventional procedures, typically by recrystallization from a suitable solvent, such as a loweralkanol.

Thereafter, the thiazole material is quaternized by reaction with an appropriate quaternizing agent, preferably a primary loweralkyl ester of p-toluenesulfonic acid. In the quaternization reaction, it is preferable to employ one molecular quantity of thiazole material and one or more molecular quantities of quaternizing agents. Good results are obtained when the quaternizing is conducted at temperatures of from about 100° C. to about 160° C. Preferably, the quaternization is conducted in an inert liquid reaction medium. As a result of such procedures, there is prepared the uncomplexed thiazolium compound of Formula I wherein X represents p-toluenesulfonate and $m$ accordingly represents 1.

This thiazolium compound is separated from the reaction mixture in any of the conventional separation techniques. For example, the thiazolium compound sometimes precipitates and is separated by filtration. In other instances, the reaction mixture containing the thiazolium compound as a product becomes a solid mass during the course of the reaction, and the reaction product is taken up in, and recrystallized from, a solvent, such as acetone, an alcohol, which can be methanol, ethanol, or isopropanol, or a mixture of such alcohol with another solvent, such as ether or benzene. In yet other instances, the thiazolium compound is extracted from the reaction mixture with water, a "salting out agent" added to the resulting aqueous extract to precipitate the product, and the precipiated product separated by filtration. In such procedures, the salting out agent can be any salt having as an anion the desired X moiety. Commonly, sodium or potassium salts are employed as salting out agents. Thus, in this procedure are prepared and separated all products of the structural Formula I. These compounds are purified, if desired, by conventional procedures, such as recrystallization from solvent.

The products to be employed in accordance with the present invention which are complexes of the materials of structural Formula I are prepared by reacting the corresponding uncomplexed product with the desired complexing agent, i.e., phenolic compound, urea compound, or metal salt compound, each as hereinabove defined. The reaction is conveniently carried out in an inert liquid reaction medium, preferably water or a loweralkanol, and at temperatures of from 20° C. to the boiling temperature of the reaction medium employed. The desired product is obtained in good yield when employing the reactants in amounts which represent stoichiometric proportions or an excess of the complexing agent. The reaction goes forward readily and the desired product is separated in conventional procedures, typically by filtration.

I claim:

1. A method for the control of helminth parasitic organisms of warm-blooded animal hosts, comprising contacting the parasitic organism with a parasiticidal amount of (A) a thiazolium compound of the formula:

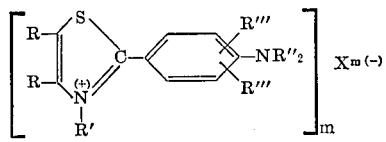

wherein X represents a pharmaceutically acceptable anion; R, each being taken separately, represents hydrogen, loweralkyl, or both R moieties, taken together, represent straight-chain alkylene of from 3 to 6 carbon atoms; R' represents primary loweralkyl, each R" independently represents hydrogen or primary loweralkyl; each R''' independently represents hydrogen, bromo, chloro, methoxy, or methyl; and $m$ represents an integer equal to the valence of the anion X; (B) its 1:1, 1:2 or 2:1 complex with a phenolic compound of the formula:

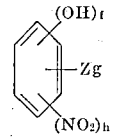

wherein each Z independently represents a member selected from the group consisting of halo, alkyl of 1 to 6 carbon atoms, inclusive, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive; the sum of $f$, $g$, and $h$ being an integer of from 1 to 6, both inclusive; (C) its 1:1, 1:2 or 2:1 complex with urea, thiourea, guanidine, guanidine hydrochloride, or biuret; (D) or its 1:1, 1:2 or 2:1 complex with a metal salt compound of the formula:

$$M_aY_b$$

wherein M represents a member selected from the group consisting of copper$^{(+)}$, copper $^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of $a$ and $b$ represents an integer such that $a$ times the valence of M is equal to $b$ times the valence of Y.

2. The method of claim 1 wherein the parasitic organism is in its infective phase and the contacting is carried out outside of the host animal body.

3. The method of improving the growth of warm-blooded animals in animal husbandry comprising orally administering to said animals, a growth improving amount of (A) a thiazolium compound of the formula:

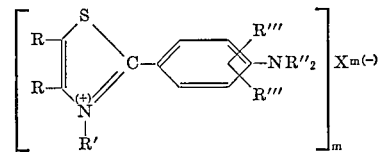

wherein X represents a pharmaceutically acceptable anion; R, each being taken separately, represents hydrogen, loweralkyl, or both R moieties, taken together, represent straight-chain alkylene of from 3 to 6 carbon atoms; R' represents primary loweralkyl; each R" independently represents hydrogen or primary loweralkyl; each R''' independently represents hydrogen, bromo, chloro, methoxy, or methyl; and $m$ represents an integer equal to the valence of the anion X; (B) its 1:1, 1:2 or 2:1 complex with a phenolic compound of the formula:

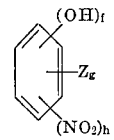

wherein each Z independently represents a member selected from the group consisting of halo, alkyl of 1 to 6 carbon atoms, inclusive, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive; the sum of $f$, $g$, and $h$ being an integer of from 1 to 6, both inclusive; (C) its 1:1, 1:2 or 2:1 complex with urea, thiourea, guanidine, guanidine hydrochloride, or biuret; (D) or its 1:1, 1:2 or 2:1 complex with a metal salt compound of the formula:

$$M_aY_b$$

wherein M represents a member selected from the group consisting of copper$^{(+)}$, copper $^{(++)}$, iron$^{(++)}$, iron$^{(+++)}$, antimony$^{(+++)}$, bismuth$^{(+++)}$, tin$^{(++)}$, manganese$^{(++)}$, zinc(++), and cadmium(++); Y represents a pharmaceutically acceptable anion; and each of a and b represents an integer such that a times the valence of M is equal to b times the valence of Y.

4. The method of claim 3 wherein the thiazolium compound is 2-(p-dimethylaminophenyl)-3,4,5-trimethylthiazolium iodide.

5. The method of claim 3 wherein the thiazolium compound is 2-(p-dimethylaminophenyl)-4,5,6,7-tetrahydro-3-methylbenzothiazolium iodide.

6. The method of claim 3 wherein the thiazolium compound is 2-(p-dimethylaminophenyl)-3,4,5-trimethylthiazolium chloride 1:1 complex with zinc chloride.

7. The method of improving the growth of animals comprising orally administering to an animal a composition comprising from 0.5 to 98 percent by weight of the total composition of an active ingredient in intimate admixture with an innocuous ingestible adjuvant, the composition being administered in an amount sufficient to provide a growth improving amount of (A) a thiazolium compound of the formula:

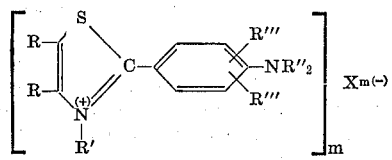

wherein X represents a pharmaceutically acceptable anion; R, each being taken separately, represents hydrogen, loweralkyl, or both R moieties, taken together, represent straight-chain alkylene of from 3 to 6 carbon atoms; R' represents primary loweralkyl; each R" independently represents hydrogen or primary loweralkyl; each R'" independently represents hydrogen, bromo, chloro, methoxy, or methyl; and $m$ represents an integer equal to the valence of the anion X; (B) its 1:1, 1:2 or 2:1 complex with a phenolic compound of the formula:

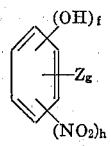

wherein each Z independently represents a member selected from the group consisting of halo, alkyl of 1 to 6 carbon atoms, inclusive, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive; the sum of $f$, $g$, and $h$ being an integer of from 1 to 6, both inclusive; (C) its 1:1, 1:2 or 2:1 complex with urea, thiourea, guanidine, guanidine hydrochloride, or biuret; (D) or its 1:1, 1:2 or 2:1 complex with a metal salt compound of the formula:

$$M_aY_b$$

wherein M represents a member selected from the group consisting of copper(+), copper(++), iron(++), iron(+++), antimony(+++), bismuth(+++), tin(++), manganese(++), zinc(++), and cadmium(++); Y represents a pharmaceutically acceptable anion; and each of a and b represents an integer such that a times the valence of M is equal to b times the valence of Y.
(etaoinshrdlucmfwyp 8. The method of claim 7 wherein the composition is administered in an amount sufficient to provide a dosage of from 0.1 to 1,000 milligrams of the thiazolium compound per kilogram of animal body weight.

9. The method of claim 8 wherein the thiazolium compound is 2-(p-dimethylaminophenyl) - 3,4,5-trimethylthiazolium iodide.

10. The method of claim 8 wherein the thiazolium compound is 2-(p-dimethylaminophenyl)-4,5,6,7-tetrahydro-3-methylbenzothiazolium iodide.

11. The method of claim 8 wherein the thiazolium compound is 2-(p-dimethylaminophenyl)-3,4,5-trimethylthiazolium chloride 1:1 complex with zinc chloride.

12. A composition useful for growth promotion in animals comprising from 0.5 to 98 percent by weight of the total composition of an active ingredient in intimate admixture with an orally ingestible finely divided solid, the active ingredient being (A) a thiazolium compound of the formula:

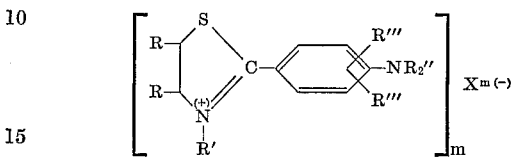

wherein X represents a pharmaceutically acceptable anion; R, each being taken separately, represents hydrogen, loweralkyl, or both R moieties, taken together, represent straight-chain alkylene of from 3 to 6 carbon atoms; R' represents primary loweralkyl; each R" independently represents hydrogen or primary loweralkyl; each R'" independently represents hydrogen, bromo, chloro, methoxy, or methyl; and m represents an integer equal to the valence of ahe anion X; (B) its 1:1, 1:2 or 2:1 complex with a phenolic compound of the formula:

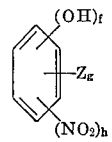

wherein each Z independently represents a member selected from the group consisting of halo, alkyl of 1 to 6 carbon atoms, inclusive, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive; the sum of $f$, $g$, and $h$ being an integer of from 1 to 6, both inclusive; (C) its 1:1, 1:2 or 2:1 complex with urea, thiourea, guanidine, guanidine hydrochloride, or biuret; (D) or its 1:1, 1:2 or 2:1 complex with a metal salt compound of the formula $$M_aY_b$$

wherein M represents a member selected from the group consisting of copper(+), copper(++), iron(++), iron(+++), antimony(+++), bismuth(+++), tin(++), manganese(++), zinc(++), and cadmium(++); Y represents a pharmaceutically acceptable anion; and each of a and b represents an integer from such that a times the valence of M is equal to b times the valence of Y.

13. A composition useful for growth promotion in animals comprising from 5 to 98 percent by weight of the total composition of an active material in admixture with an orally ingestible surface-active dispersing agent, said active material being (A) a thiazolium compound of the formula:

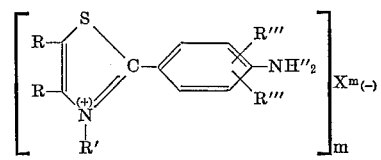

wherein X represents a pharmaceutically acceptable anion; R, each being taken separately, represents hydrogen, loweralkyl, or both R moieties, taken together, represent straight-chain alkylene of from 3 to 6 carbon atoms; R' represents primary loweralkyl; each R" independently represents hydrogen or primary loweralkyl; each R'" independently represents hydrogen, bromo, chloro, methoxy, or methyl; and $m$ represents an integer equal to the valence of the anion X; (B) its 1:1, 1:2 or 2:1 complex with a phenolic compound of the formula:

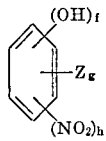

wherein each Z independently represents a member selected from the group consisting of halo, alkyl of 1 to 6 carbon atoms, inclusive, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive; the sum of $f$, $g$, and $h$ being an integer of from 1 to 6, both inclusive; (C) its 1:1, 1:2 or 2:1 complex with urea, thiourea, guanidine, guanidine hydrochloride, or biuret; (D) or its 1:1, 1:2 or 2:1 complex with a metal salt compound of the formula:

$$M_aY_b$$

wherein M represents a member selected from the group consisting of copper (+), copper (++), iron (++), iron (+++), antimony (+++), bismuth (+++), tin (++), manganese (++), zinc (++), and cadmium (++); Y represents a pharmaceutically acceptable anion; and each of $a$ and $b$ represents an integer such that $a$ times the valence of M is equal to $b$ times the valence of Y.

14. The animal feed comprising an animal feed and 0.001 to 0.5 percent by weight of (A) a thiazolium compound of the formula:

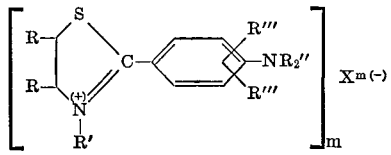

wherein X represents a pharmaceutacally acceptable anion; R, each being taken separately, represents hydrogen, loweralkyl, or both moieties, taken together, represent straight-chain alkylene of from 3 to 6 carbon atoms; R' represents primary loweralkyl; each R" independently represents hydrogen or primary loweralkyl; each R''' independently represents hydrogen, bromo, chloro, methoxy, or methyl; and $m$ represents an integer equal to the valence of the anion X; (B) its 1:1, 1:2 or 2:1 complex with a phenolic compound of the formula:

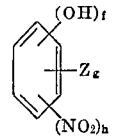

wherein each Z independently represents a member selected from the group consisting of halo, alkyl, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive; the sum of $f$, $g$, and $h$ being an integer of from 1 to 6, both inclusive; (C) its 1:1, 1:2 or 2:1 complex with urea, thiourea, guanidine, guanidine hydrochloride, or biuret; (D) or its 1:1, 1:2 or 2:1 complex with a metal salt compound of the formula:

$$M_aY_b$$

wherein M represents a member selected from the group consisting of copper (+), copper (++), iron (++), iron (+++), antimony (+++), bismuth (+++), tin (++), manganese (++), zinc (++), and cadmium (++); Y represents a pharmaceutically acceptable anion; and each of $a$ and $b$ represents an integer such that $a$ times the valence of M is equal to $b$ times the valence of Y.

15. The composition of claim 14 wherein the thiazolium compound is 2-(p-dimethylaminophenyl)-3,4,5-trimethylthiazolium iodide.

16. The composition of claim 14 wherein the thiazolium compound is 2-(p-dimethylaminophenyl)-4,5,6,7-tetrahydro-3-methylbenzothiazolium iodide.

17. The composition of claim 14 wherein the thiazolium compound is 2-(p-dimethylaminophenyl)-3,4,5-trimethylthiazolium chloride 1:1 complex with zinc chloride.

References Cited

UNITED STATES PATENTS

| | | | |
|---|---|---|---|
| 3,334,082 | 8/1967 | Reifschneider | 280—96.5 |
| 3,408,444 | 10/1968 | KlingBail | 424—245 |

OTHER REFERENCES

Merck Index, p. 795, 1960.

ALBERT T. MEYERS, Primary Examiner

F. E. WADDELL, Assistant Examiner

U.S. Cl. X.R.

424—270